Patented Dec. 28, 1948

2,457,405

UNITED STATES PATENT OFFICE 2,457,405

HALO NITROPARAFFIN MODIFIED AMINOPLASTS

Milton J. Scott, Springfield, Mass., assignor to Monsanto Chemical Company, St. Louis, Mo., a corporation of Delaware No Drawing. Application September 25, 1945, Serial No. 618,589

11 Claims. (Cl. 260—67.6)

This invention relates to aminotriazine reaction products. More particularly, the invention relates to reaction products of aminotriazines and halogenated nitroparaffins and to methods of making such products.

An object of this invention is to provide new aminotriazine reaction products.

A further object is to provide halogenated nitroparaffin-modified aminotriazines.

These and other objects are attained by reacting halogenated nitroparaffins with aminotriazines in the presence of aldehydes. In a further embodiment of the invention halogenated nitroparaffins are reacted with alkylol aminotriazines with or without unsubstituted aliphatic alcohols as a third component of the reaction.

The following examples are given in illustration of this invention and are not intended to limit the scope thereof. Where parts are mentioned they are parts by weight.

Example I 486 parts (6 mols) of formalin (37% formaldehyde) and 369 parts (3 mols) of 1-chloro-1-nitropropane were added to an aqueous dispersion containing 126 parts (1 mol) of melamine. The pH of the admixture was adjusted to about 8–9 with alkali and the mixture was then heated under reflux at atmospheric pressure for one hour. A dark colored aqueous solution was obtained. The solution was treated with alkali to readjust the pH to about 8–9 and then dehydrated under vacuum to obtain a brown resin. The resin was at least partially soluble in alcohols, ketones, dioxane and water.

Example II 657 parts (6 mols) of 1-chloro-1-nitroethane were added to an aqueous suspension containing 206 parts (1 mol) of hexamethylol melamine and the pH of the mixture was adjusted to about 6–8 by the addition of alkali. The mixture was refluxed for 90 minutes at atmospheric pressure to obtain a straw-colored aqueous solution from which a light yellow resin was obtained on neutralization and vacuum distillation. The resin was at least partially soluble in alcohols, ketones, dioxane and water.

Example III 206 parts (1 mol) of hexamethylol melamine were suspended in 96 parts of methanol (3 mols). 328 parts (3 mols) of 1-chloro-1-nitroethane and 5 cc. phosphoric acid were added to the suspension and the mixture refluxed at atmospheric pressure for 2 hours. The resulting solution was neutralized and vacuum dehydrated to recover the resin. The resin was light brown in color and was water-soluble. The resin was at least partially soluble in alcohols, ketones, dioxane. and water.

Example IV 126 parts (1 mol) of melamine were mixed with 380 parts (5 mols) of formalin (37% formaldehyde), 592 parts (8 mols) of butanol and 370 parts (3 mols) of 1-chloro-1-nitro-propane. The pH of the mixture was adjusted to about 6–7 with alkali and the temperature of the mixture was raised until azeotropic distillation of butanol and water began. The reaction was continued at this temperature and the butanol-rich phase of the distillate continuously returned to the reaction until only a single phase was found in the distillate. At this point anhydrous butanol was added to the reaction mixture and wet butanol distilled from the mixture until the specific gravity of the distillate indicated that substantially all of the water had been removed from the mixture. The mixture was then concentrated by vacuum distillation and xylol was added to the concentrate to obtain a clear, substantially colorless syrup. The resin was insoluble in water, soluble in alcohols, ketones and dioxane and at least partially soluble in coal tar solvents and mineral spirits.

The resins produced as shown in the examples may be recovered from solution by other conventional methods such as oven drying, etc.

The halogenated nitroparaffins which may be used in this invention are organic compounds of the paraffin series in which at least one hydrogen atom has been replaced by an $NO_2$ group, at least one hydrogen atom is attached to the same carbon atom to which the $NO_2$ group is attached, and which compound contains at least one halogen atom. Examples of such halogenated nitroparaffins are 1-chloro-1-nitroethane, 1-chloro-1-nitropropane, 1-chloro-1-nitrobutane, 1-fluoro-1-nitroethane, 1-bromo-1-nitropropane, 1-iodo-1-nitroethane, 2-nitro-1-trichloro-propane, 2-chloro-1-nitrobutane, 3-nitro-2-chloro pentane, etc. Mixtures of these halogenated nitroparaffins may also be used.

Other aldehydes may be used to replace the formaldehyde of Examples I and IV or to produce the alkylol aminotriazines of Examples II and III such as saturated and unsaturated alkyl, aralkyl, aryl, or heterocyclic aldehydes, for example, acetaldehyde, propionaldehyde, butyraldehyde, crotonaldehyde, acrolein, benzaldehyde, cinnamaldehyde, furfural, etc. Mixtures of the above named aldehydes may also be employed.

The melamine shown in the above examples may be replaced, in whole or in part by other aminotriazines such as 2,4-diamino-1,3,5-triazine, 2-amino-1,3,5-triazine, melam, melem, aminotriazines in which one or two amino groups are substituted by hydroxy, halogen, alkyl, aryl or aralkyl groups such as 2-hydroxy-4,6-diamino-1,3,5-triazine, 2,4-dihydroxy-6-amino-1,3,5-triazine, 2-chloro-4,6-diamino-1,3,5-triazine, 2-p-hydroxy phenylene-4,6-diamino-1,3,5-triazine, 2-phenyl-4-amino-6-hydroxy-1,3,5-triazine, aminotriazines wherein the hydrogen atoms of the amino groups are partially substituted by amino, alkyl, aryl, or aralkyl groups such as mono-, di-, or tri- alkyl-melamines, e. g., 2,4,6-triethyl-triamino-1,3,5-triazine, mono-, di-, or tri- aralkyl, or mono-, di-, or tri- aryl melamines, e. g., 2,4,6-triphenyl-triamino-1,3,5-triazine, etc. Mixtures of the aminotriazines may be employed.

In Example III, the methanol may be replaced in whole or in part by unsubstituted aliphatic, aromatic or mixed aliphatic aromatic-alcohols, or mixtures of such alcohols. For example, methanol, ethanol, propanol, butanol, benzyl alcohol, polyhydric alcohols, such as glycol, glycerol, etc.

The resins obtained vary in color, water-solubility, and other physical characteristics such as hardness, elasticity, electrical resistance, etc., depending on (1) the aminotriazine used, (2) the halogenated nitroparaffin used, (3) the alcohol used, (4) the aldehyde used, and (5) the proportions of the various reactants used. As a result, the product may be tailored to suit the particular application for which it is intended.

The resins may be hardened by heating with or without the addition of acid reacting catalysts which may be acids per se, acid salts or materials which may become acidic under heat. Such catalysts include diammonium phosphate, ammonium oxalate or other acid reacting salts, etc.

The resins may be used in protective coatings, such as fungus-resistant coatings, marine algae-resistant coatings, or the conventional type of coatings, textile sizes, paper sizes, binders for low pressure laminates, such as fiber glass or plywood laminates, binders or abrasives and in many other industrial fields.

The resins may be compounded with other conventional ingredients varying according to the properties desired. For example, there may be added filler, pigments, dyes, natural or synthetic resins such as rosin, kauri, alkyd resins, vinyl resins, cellulose derivatives, urea resins, urea-thiourea resins, drying oils such as linseed oil, tung oil, etc. For example, a coating composition comprising 100 parts of an alkyd resin such as a dehydrated castor oil modified glyceryl-phthalate resin, 20 parts of a resin made according to Example I, and 0.02 part of a manganese drier, produced hard, glossy films having improved chemical and water resistance when compared to the unmodified alkyd resin.

The foregoing description is given in illustration and not in limitation of the invention as set forth in the appended claims.

What is claimed is:

1. A resinous heat reaction product of an aldehyde reactable aminotriazine, an aldehyde and a halogenated nitroparaffin in which at least one hydrogen atom is attached to the same carbon atom to which the nitro group is attached said nitroparaffin containing from 2 to 5 carbon atoms and a single nitro group.

2. A resinous heat reaction product of an aldehyde reactable aminotriazine, an aldehyde, and a chloro-nitroparaffin in which at least one hydrogen atom is attached to the same carbon atom to which the nitro group is attached said nitroparaffin containing from 2 to 5 carbon atoms and a single nitro group.

3. A resinous heat reaction product of melamine, an aldehyde and a halogenated nitroparaffin in which at least one hydrogen atom is attached to the same carbon atom to which the nitro group is attached said nitroparaffin containing from 2 to 5 carbon atoms and a single nitro group.

4. A resinous heat reaction product of melamine, an aldehyde and a chloro-nitroparaffin in which at least one hydrogen atom is attached to the same carbon atom to which the nitro group is attached said nitroparaffin containing from 2 to 5 carbon atoms and a single nitro group.

5. A resinous heat reaction product of an aminotriazine-aldehyde condensation product and a halogenated nitroparaffin in which at least one hydrogen atom is attached to the same carbon atom to which the nitro group is attached, said nitroparaffin containing from 2 to 5 carbon atoms and a single nitro group.

6. A resinous heat reaction product as in claim 5 in which the halogenated nitroparaffin is a chloro-nitroparaffin said nitroparaffin containing from 2 to 5 carbon atoms and a single nitro group.

7. A resinous heat reaction product of melamine, formaldehyde, and a halogenated nitroparaffin in which at least one hydrogen atom is attached to the same carbon atom to which the nitro group is attached said nitroparaffin containing from 2 to 5 carbon atoms and a single nitro group.

8. A resinous heat reaction product as in claim 7 wherein the halogenated nitroparaffin is a chloro-nitroparaffin said nitroparaffin containing from 2 to 5 carbon atoms and a single nitro group.

9. A resinous heat reaction product of an aldehyde reactable aminotriazine, an aldehyde, an unsubstituted alcohol, and a halogenated nitroparaffin in which at least one hydrogen atom is attached to the same carbon atom to which the nitro group is attached, said nitroparaffin containing from 2 to 5 carbon atoms and a single nitro group.

10. A resinous heat reaction product as in claim 9 wherein the halogenated nitroparaffin is a chloro-nitroparaffin.

11. A resinous heat reaction product as in claim 9 wherein the aminotriazine is melamine, the aldehyde is formaldehyde and the halogenated nitroparaffin is a chloro-nitroparaffin.

MILTON J. SCOTT.

REFERENCES CITED

The following references are of record in the file of this patent:

Fuson and Snyder, Organic Chemistry, page 157 (1942) John Wiley and Sons.